United States Patent
Gertmar et al.

(10) Patent No.: US 8,436,490 B2
(45) Date of Patent: May 7, 2013

(54) WIND MILL POWER FLOW CONTROL WITH DUMP LOAD AND POWER CONVERTER

(75) Inventors: Lars Gertmar, Västerås (SE); Hans Christian Christensen, Copenhagen (DK); Erik Kolby Nielsen, Odense (DK); Jouko Niiranen, Helsinki (FI); Stefan Thorburn-Johansson, Västerås (SE); Leif-Erik Wraee, Tommerup (DK)

(73) Assignee: ABB Research Ltd., Zürich (CH)

( * ) Notice: Subject to any disclaimer, the term of this patent is extended or adjusted under 35 U.S.C. 154(b) by 818 days.

(21) Appl. No.: 11/991,326

(22) PCT Filed: Aug. 30, 2006

(86) PCT No.: PCT/SE2006/000999
§ 371 (c)(1),
(2), (4) Date: Dec. 8, 2009

(87) PCT Pub. No.: WO2007/027141
PCT Pub. Date: Mar. 8, 2007

(65) Prior Publication Data
US 2010/0292852 A1   Nov. 18, 2010

Related U.S. Application Data

(60) Provisional application No. 60/712,125, filed on Aug. 30, 2005.

(51) Int. Cl.
*H01H 79/00* (2006.01)
(52) U.S. Cl.
USPC .......................................................... 307/100
(58) Field of Classification Search ............ 307/100
See application file for complete search history.

(56) References Cited

U.S. PATENT DOCUMENTS

| 6,411,067 B1 | 6/2002 | Björklund |
| 7,012,409 B2 | 3/2006 | Schreiber et al. |

(Continued)

FOREIGN PATENT DOCUMENTS

| EP | 1557925 A2 | 7/2005 |
| WO | WO-99/50945 A1 | 10/1999 |

(Continued)

OTHER PUBLICATIONS

A. Papantoniou et al; Simulation of FACTS for wind farm applications; IEE, 1997; London, UK; pp. 8/1-8/5.

(Continued)

*Primary Examiner* — Hal Kaplan
(74) *Attorney, Agent, or Firm* — Venable LLP; Eric J. Franklin

(57) ABSTRACT

A wind mill apparatus for generating electric power to a grid point of an electric network. The apparatus includes a wind rotor, an electric generator operatively connected to the wind rotor, and an electric multiphase ac link operatively connecting the generator to the grid point. The ac link includes a first current path including a switchgear, a second current path including a dc link including a first converter operatively connected to the generator, a second converter operatively connected to the grid point, and a capacitor operatively connected between the conductors of the dc link. The ac link further includes a connectable multiphase dump load for blocking during a fault condition on the network the reactive power flow in the ac link, yet providing a reduced transfer of active power.

11 Claims, 2 Drawing Sheets

U.S. PATENT DOCUMENTS 8,120,932 B2 * 2/2012 Folts et al. .................. 363/37
2005/0200337 A1 9/2005 Schreiber et al.

FOREIGN PATENT DOCUMENTS

| WO | WO-00/67355 A1 | 11/2000 |
| WO | WO-00/67363 A1 | 11/2000 |
| WO | WO-2005/062438 A1 | 7/2005 |

OTHER PUBLICATIONS

PCT/ISA/210—International Search Report—Dec. 7, 2006.
PCT/IPEA/409—Intrnational Preliminary Report on Patentability—Aug. 31, 2007.

* cited by examiner

WIND MILL POWER FLOW CONTROL WITH DUMP LOAD AND POWER CONVERTER

CROSS-REFERENCE TO RELATED APPLICATIONS

This application claims priority to U.S. provisional patent application 60/712,125 filed 30 Aug. 2005 and is the national phase under 35 U.S.C. §371 of PCT/SE2006/000999 filed 30 Aug. 2006.

TECHNICAL FIELD

The present invention concerns an electric power generation system. Preferably the system comprises electric power generating means and a transmission line connected to a grid point of an electric power network. The network comprises a plurality of power consumers and other power generating units. The power consumers comprise preferably motors, furnaces and the like and may be represented by loads on the network. Especially the invention concerns a power generating system comprising a wind mill. Commonly a plurality of wind mills is assembled into wind mill parks. Such wind mill parks may contain up to a hundred wind mill units and are preferably located at sea. Typically a wind mill comprises a rotor with vanes connected to an electric generator via a gear box. The wind mill also contains electrical equipment, such as transformer and converters, and means for controlling the electric and mechanical equipment.

BACKGROUND OF THE INVENTION

From U.S. Pat. No. 7,012,409 (Schreiber) a power converter circuit for a generator with dynamically variable power output is previously known. The power converter circuit comprises a wind power system connected to a grid point of an electric network. The object of the power converter circuit is to provide an expanded connection of a generator that outputs dynamically variable power to the electric network. A further object is to introduce a triggering method by which reactive power may be fed into the electric network in the event of a short circuit.

The known electric power circuit comprises two individual connections to the network. A first connection comprises a direct connection to the network by which electric power is fed during high wind speeds when the wind mill is capable of generating power at a constant speed. A second connection comprises a first and second converter connected in a back-to-back configuration with a capacitor. By this connection also power generated at low wind speeds, when the wind mill is controlled at a varying speed, may be fed into the network. The first and second converter comprises voltage source converters (VSC) containing self commutating power electronics (PE).

The triggering method comprises three operation modes following a short circuit in the network. In the event of a network short circuit the generator is automatically disconnected from the electrical network and during a first period of time the second converter outputs reactive power from the capacitor to the network. During a second period of time the second converter draws operating power from the network and feeds reactive power back to the network. Finally, during a third period of time when the generator is still disconnected the converter system controls the gentle restart of the generator until the generator again furnish energy to the electrical network.

In the known electric power circuit the wind mill is automatically disconnected in an event of short circuit in the network. This disconnection implies on the one hand that the rotating system, containing a considerable moment of inertia, must be decelerated by peripheral forces. On the other hand the wind mill looses the synchronization to the network which implies a time consuming restart of the generator.

From WO 2005/062438 an electric power network is previously known, the object of which is to control the power transmission in a power network during a fault condition. This object is achieved by introducing at a fault condition a voltage raising means between a rotating electric machine and its connection to the network. On sensing a fault condition in the network the voltage raising means are introduced to prevent the normal protecting devices to respond and disconnect the rotating electric machine from the network.

In a normal generating mode of the wind mill the produced energy is in balance with the power consumption of the network. Hence the rotating mechanical force from the wind mill is balanced by the electromotive force (emf) from the network. A sudden disconnection of the generator from the network interrupts this force balance and the wind rotor starts free wheeling. The rotating part of a wind mill containing a rotor with vanes, a gear box and the rotor of the generator exhibits when rotating a considerable moment of inertia. When the wind mill is suddenly disconnected from the network the moment of inertial will cause the speed of the wind mill rotor to increase. Since also the wind mill continues to introduce wind power to the rotor the rotation speed will further increase.

This increase in rotation may be retarded by mechanical brakes and by regulating the pitch of the vanes. However these mechanical regulating systems are slow. Due to time consuming regulation of the wings of the wind mill and due to the fact that the wind is still transferring wind energy to the wind mill the speed of the rotor is further increased. By the time the rotor experience retardation from the mechanical regulation the rotor speed may already have reached hazardous levels.

There are known a plurality of ways to reduce the speed of the disconnected wind mill rotor. Most of these methods convert mechanical energy into heat which is dissipated to the air. However there is no control of the wind mill once it has been disconnected from the network. Thus the synchronization is lost and therefore the wind mill has to be started from scratch. This is time consuming and during this time the wind mill will not generate power to the network.

There is thus a need within the wind power industry to maintain the power generation as long as possible in a short circuit situation on the network.

SUMMARY OF THE INVENTION

A primary object of the present invention is to seek ways to improve the power production from a wind mill.

This object is achieved according to the invention by a wind mill apparatus or by a method.

According to the invention an electric energy consumer, a dump load, is introduced between the generator and the grid point. The dump load is intended for consuming energy from the rotor system of the wind mill apparatus when the wind mill experience a fault situation in the grid point. By connecting such a dump load in a fault situation the passage of reactive energy is stopped while still active energy may pass at a reduced rate. The dump load is also direct connected to the generator and will thus provide a smooth retardation force to the generator and the whole rotating system. The dump load will keep the voltage in the wind mill circuit at a high level thus preventing switchgear apparatus to disconnect the wind mill from the grid point. By using such a dump load the synchronization with the grid point will be kept thus providing a fast reconnection of the wind mill to the network when the fault condition has elapsed.

The wind mill apparatus comprises a first and second connection to the grid point. The first connection is a direct multiphase connection between the generator and the grid point. The second connection comprises a dc link containing a first voltage source converter (VSC) connected to the generator and a second voltage source converter connected to the grid point. In a first mode of operation, when the wind speed is sufficient to rotate the wind mill at a normal speed, the first connection is used. In a second mode of operation, when the wind is poor and the wind mill speed may be slower than in the normal mode, the second connection is used. In this way of operation the rating of the power electronics in the VSC may be reduced to 50% or preferable 30% of the generator rating.

In a fault situation at nominal power generation the dump load will immediately be connected directly to the generator, thus keeping the voltage and synchronization, and providing a retardation force to the rotating system of the wind mill. In a fault situation at reduced power, when using the second connection, the dump load is still connected directly to the generator, thus keeping the voltage and providing a retardation force to the rotating system. In this second situation the dc link is also activated thus the second VSC keeps track of the synchronization and the first converter may provide magnetization energy to the generator. In an embodiment of the invention the generator comprises an asynchronous machine. In another embodiment the generator comprises a double fed induction generator (DFIG).

Normally a fault situation comprises a two phase fault, which in a rotating multiphase system also affects the other phases in the system. This causes asymmetry in the electric system. Asymmetry causes torque ripple in the generator and may cause damage to a gear box connected to the generator. Hence according to the invention a multiphase dump load is only introducing energy consumption to the phases that experience a fault situation.

In an embodiment of the invention the dump load comprises resistor means which temporarily may be connected in shunt connection to the current path between the generator and the grid point. In another embodiment the dump load comprises a resistor means connected in parallel with the capacitor of the dc link. In yet another embodiment the dump load comprises a resistor means connected in series with the generator of the wind mill.

In a further embodiment of the invention the wind mill apparatus comprises computer means and storage means containing an executable computer program containing instructions for the computer to control the wind mill apparatus.

In a first aspect of the invention the object is achieved by a wind mill apparatus for generating electric power to a grid point of an electric network, the apparatus comprising a wind rotor and connected thereto an electric generator, and an electric multiphase ac link connecting the generator the grid point, the link comprising a first current path comprising a switchgear, a second current path comprising a dc link containing a first converter connected to the generator, a second converter connected to the grid point, and capacitor means connected between the conductors of the dc link, wherein the ac link further comprises a connectable multiphase dump load for blocking during a fault condition on the network the reactive power flow in the ac link, yet providing a reduced transfer of active power. In an embodiment of the invention the dump load comprises electric energy consumption for providing a retardation force on the generator. In another embodiment of the invention the dump load comprises resistor means. In yet another embodiment the dump load comprises a resistor means connected between the conductors of the dc link.

In a second aspect of the invention the objects are achieved by a method for maintaining a power production from a wind mill apparatus during a fault condition in a grid point of a network comprising a wind rotor and connected thereto an electric generator, and an electric multiphase ac link connecting the generator the grid point, the link comprising a first current path comprising a switchgear, a second current path comprising a DC link containing a first converter connected to the generator, a second converter connected to the grid point, and capacitor means connected between the conductors of the dc link, wherein the method comprises; providing at a first mode of operation power trough the first current path, providing at a second mode of operation power through the second current path, and blocking during a fault condition on the network the reactive power flow in the ac link, yet providing a reduced transfer of active power. In an embodiment of the invention the blocking step further comprises consumption of electric energy from the generator. In another embodiment the dump load comprises resistor means for providing a retardation force on the generator. In yet another embodiment the dump load comprises a resistor means connected between the conductors of the dc link.

BRIEF DESCRIPTION OF THE DRAWINGS

Other features and advantages of the present invention will become more apparent to a person skilled in the art from the following detailed description in conjunction with the appended drawings in which.

DESCRIPTION OF PREFERRED EMBODIMENTS

Among the technical area of power production by wind mills there are a plurality of needs to fulfill. A first need is; Cost-effective, highly available wind turbines form a main problem. It may shortly be expanded as: "brush-less generators close to motor standard" and "partly rated power electronic converters". A second need is;

Avoiding wind power generation park disconnection during grid voltage dips. It may be expanded as: "to drive-through wind turbines at grid-faults" and "to release collection & transmission (C&T) grids from electrical stress". This issue is under harmonization within the common market of EG but today under national grid codes. A third need is: Avoiding excessive mechanical drive-train stress in wind turbines during various normal operation as well as at grid faults is the third one. It may be expanded as "to release their drive-trains from mechanical stress due to high winds and/or three-phase or two-phase faults".

The new brush-less method according to the invention and circuit is based on asynchronous machines, on partly (30%) rated power electronics and on low-voltage control- & switch-gear. All are high-performance products with 100 000s of hours or maneuvers, almost loss-less and very reliable.

The main demand on all solutions is that the electrical system shall be cost-effective, reliable, available and efficient. Efficiency is seen over a long period of operation. So, there can be temporary losses in an electrical system as long as it is negligible energy loss seen from cost, loss-of-production and/or temperature rise in the electrical equipment. Solutions which are improper in motor drives can be used as long as they are cost-effective, reliable and available in generating units. The solution is technically visualized in FIGS. 1 and 2 which is a block diagram for normal operation of a wind turbine typically rated >3 MW.

Figure 1:
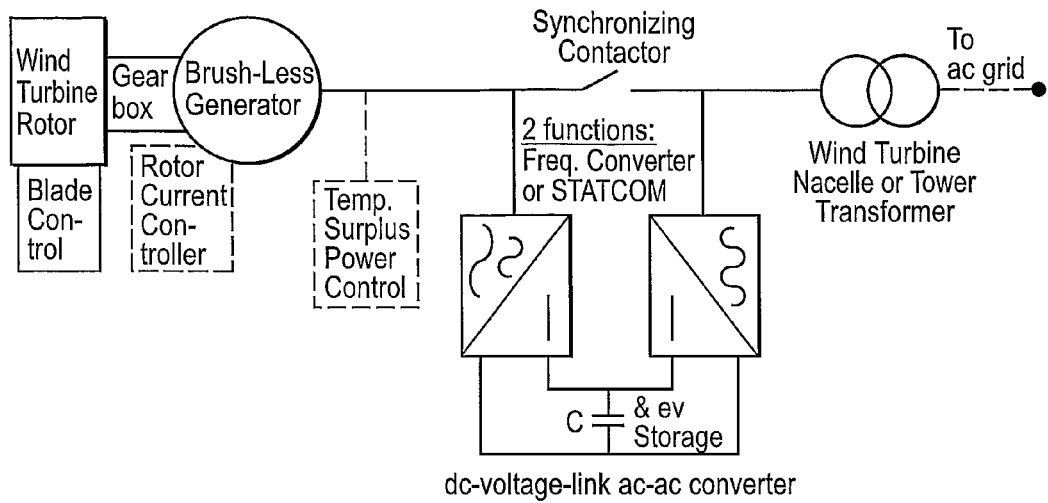
FIG. 1 is a principal circuit of a wind mill apparatus according the invention.
Figure 2:
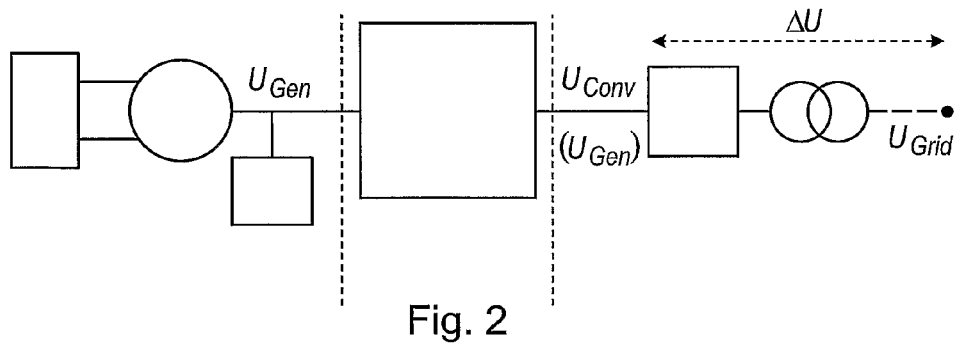
FIG. 2 is an embodiment of the wind mill apparatus.
Figure 4:
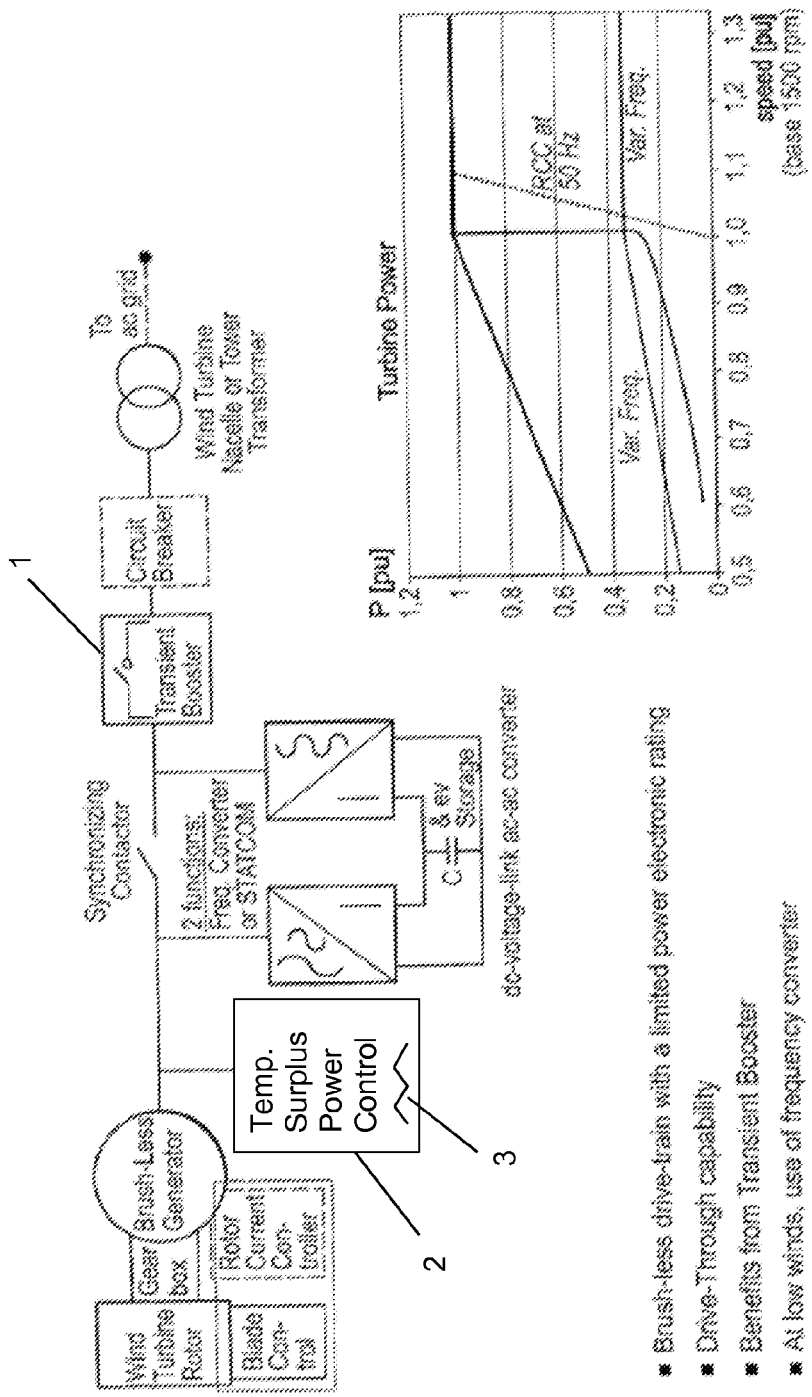
FIG. 4 is summary table of the wind mill apparatus of the invention.

FIG. 1 illustrates an embodiment of a principal circuit of a wind mill apparatus according to the invention. FIG. 2 illustrates an embodiment of a wind mill apparatus according to the invention. FIG. 4 illustrates a summary table of an embodiment of a wind mill apparatus according to the invention, a graph showing a relationships between turbine power and speed, and a list of aspects and benefits of embodiments of the invention. The embodiment of the invention illustrated in FIG. 4 includes a transient booster 1, temporary surplus power control 2, which can include resistor 3.

The principle is established from a synthesis approach. It is a clear intention to keep high efficiency and low drive-train stress during normal operation. During any faults, there is a need to keep up a high positive-sequence voltage at the brushless induction generator's stator winding and to keep down the negative-sequence voltage and to allow rotation of the flux in the air-gap. There is also a need to create well-nigh symmetrical voltages at the IG's terminals to magnetize the air-gap for best torque production and to load the rotor winding with low-slip-frequency rotor currents only via an optional rotor current controller (Weier: RCC4, Vestas: OptiSlip® rarely called VRCC). A requirement is to keep the actual power flow from the turbine rotor through the shaft to be able to stay "in synchronism" during faults. Another requirement is to cope with non-bolted and bolted faults of all types.

Ideally, induction generators should be connected to very stiff AC grids/networks. Electrical stress like low voltage and over-currents appear in weak grids/networks at transient occurrences like short circuit faults:

Drain and disorder of reactive power occurs then in all AC equipment

Disturbed magnetization of air-gaps occurs then in all generators

One solution currently utilized does not avoid disconnection during grid voltage dips because capacitor included in power factor compensation equipment do not cope with low voltage and even short-time disconnections Double fed induction generators (DFIGs) of today do not avoid disconnection during grid voltage dips because party rated frequency converters embedded in DFIGs do not cope with low voltage and even short-time disconnections.

Problems with wind power that embodiments of the invention address include eliminating transient and continuous low voltage and over-current stress by using existing and new equipment in ways that reduce time periods with out-of borders.

Induction (=Asynchronous) machines are preferred by many wind turbine manufacturers as generators, IGs, in wind turbines, since they are robust and cost-effective. When using IGs, it is necessary:

that the mechanical system of the wind turbine generator systems comprises a gearbox to adapt speed from the turbine rotor to the IG's cost-effective base speeds, 1500 rpm or 1000 rpm that the IG is brush-less to avoid regular maintenance, affected by various rotor current loading, various humidity, various temperature, etc, i.e., a site dependence, and that the electrical system comprises more electrical equipment than the IG in the nacelle as well as in a transmission and distribution, T&D, (or collection and transmission, C&T) network More electrical equipment is needed for a safe transfer of power from the turbine rotor via shafts and gearbox, via the generator and other wind turbine generator system, WIGS, equipment and the network to central parts of a power grid.

Wind power generators are usually connected far out at the extremities of the grid/network, on sub-transmission or distribution, T&D, levels, where the network was not originally designed to transfer power back into the grid. To a growing extent, they are connected via collection and transmission, C&T, networks especially made for a wind farm and then more or less without other loads, i.e., as another type of extremities of the grid/network. Both ways are heavily depending on that the voltage is within prescribed operation levels. Plain induction generators do not contribute to regulation of voltage and they are substantial absorbers of reactive power. Ideally, they should be connected to very stiff networks in order to influence power quality, especially the voltage level, in a non-detrimental way. In a WTGS, IGs' reactive power balance, its stator voltage, is in a stationary way improved by power factor correction PFC via one or several of capacitor banks, of so-called doubly-fed IGs, DFIGs, (with brushes & slip-rings), of AC-DC-AC frequency converters, & of small-scale STATCOMs or of the like.

During and after transient occurrences in the network, e.g. 2-phase short-circuit faults, the performance of the cheaper solutions—with no or partly-rated AC-DC-AC frequency converters, like PFC-IGs, DFIGs and STATCOMs—is inadequate to secure voltage stability of the network after faults. It is caused primarily by an eventual voltage dissymmetry at 2-phase faults but at both 2- & 3-phase faults:

1. A drain and disorder of reactive power, Q (compared to the operating distribution of Q)

2. Disturbed magnetization of the air-gap in the IGs; as well as

3. Acceleration, especially above the speed associated with the IG's pullout torque, and 4. A torsional resonance transient in the mechanical part due to a shaft relaxation process.

During and after these transient occurrences, especially at 2-phase short-circuit faults, the wind and the moment of inertia will force the wind turbine rotor to continue to rotate the common shaft. In this situation, the speed of the turbine rotor will increase in an uncontrolled way. The WTGS has to be disconnected by the network's protection or by the WTGS's own protection system or by the like. A WTGS with no or only partly-rated AC-DC-AC frequency converters, like PFC-IGs, DFIGs and STATCOMs with today's state-of-art lacks capability to stay connected and drive/run-through severe transient occurrences in the network, especially 2-phase short-circuit faults where induction generators will try to run as motors due to the large transient negative-sequence voltage components during fault.

This is a severe drawback/limitation of today's electric power generating units for "new renewable energy sources" like wind turbine generation systems, capable of electric power generation connected at the extremities of the grid.

Wind turbines in networks/grids possess also 30 years experiences as industrial activity. Traditionally these power transmission systems emphasize:

Electrical power generation utilizing wind to drive the turbine rotor has, in the form of wind parks, grown to have capacities similar to central power generation facilities. For example, a number of wind parks have been build having a power generating capacity of greater than 160 MW and a wind park with a generating capacity of 640 MW is in a procurement phase and undergoing electrical simulations to assure proper function with existing sub-transmission grids and a collection and transmission network to a point of connection.

The torsion mode of the weak shaft systems in large wind turbines is due to a shaft relaxation process, commonly with resonance in the range of 1-2 Hz, not seen in simulations with stiff shafts (lumped mass consideration). 1-2 Hz is close to typical values of the electric power grid eigenfrequencies. There is thus a risk of oscillation between the wind turbines and the entire network. Such phenomena are atypical compared to previous T&D systems and installations with only central power generation where the large synchronous generators are equipped with damping windings and power system stabilizers, PSS, to damp the 1-2 Hz eigenfrequencies.

For availability and efficiency of wind power generation and for drive-through at any faults, it is advantageous to keep up a high positive-sequence voltage at a BL induction generator's stator winding and to keep down the negative-sequence voltage.

A fault can appear anywhere from the turbine transformer's medium-voltage terminals and out to the point of connection. A wind turbine shall stay connected for most of these faults. An original fault in a C&T network or a T&D grid with a temporary low voltage will be cleared by protective circuit breakers within "some hundred milliseconds". After that, the grid voltage will grow within "a few seconds" up to normal level. This is due to reactive power exchange with the C&T/T&D system connected to the generators. The time period and the shape depend on type of generator, stiffness of the shaft in the turbine drive-train, etc. and, now on the dump load introduced and a brush-less IG method with released drive train stress during normal operation as ASD or CSD, and, at the same time, controlled ride-through of wind turbines with <30% active power via power electronics.

Figure 3:
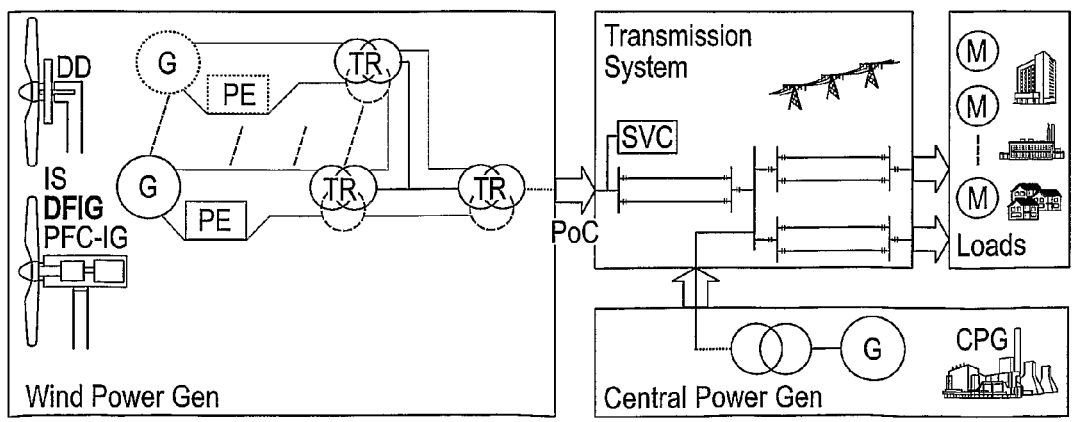
FIG. 3 is a principle of a collection and transmission grid.

An SVC, static VAr compensator, at PoC in FIG. 3 can inject reactive power to stabilize voltage. It is a highs-voltage solution to damp PFC-IGs' torque and speed oscillations in the drive-trains at fault in order to drive-through wind parks.

Active (or US: "real") power flows normally in a chain from a mechanical converter like a wind turbine rotor via an optional gearbox as mechanical power to a power generator, through a generator transformer to a large electric power system. Active power is—to a very little degree—stored in a widespread electric AC power system. Active power is converted into mechanical power, into heat, etc., for utilization of electric power more or less in the same moment it is generated. Stored electrical power system energy is mainly associated to rotational energy in generators and motors and is just some 3 seconds times the installed power in the power system. Active power is expressed in kilowatt (kW) or megawatt (MW).

Reactive (US also: "imaginary" or "Wattless") power is often explained as "the foam on the beer", implying useless but inevitable. However, such explanations don't lead to much understanding. Reactive power is the portion of electricity that establishes and sustains the electric and magnetic fields of AC equipment. Reactive power must be supplied to most types of electro-magnetic equipment, such as transformers and squirrel cage machines, whether operating as motors or generators. Reactive power must also supply reactive losses on transmission facilities. Reactive power is embedded as capacitive charging current especially in cables. Reactive power is provided by synchronous generators and synchronous condensers, electrostatic equipment such as capacitors, and by power electronic converters especially those used in HVDC Light™ & SVC Light™ and also by wind turbines, e.g., with DFIGs as well as with fully rated AC-DC-AC converters. Reactive power is expressed in kilovars (kVAr) or in megavars (MVAr).

Induction generators, like all induction machines, possess internal active and reactive power flows that act as a main problem to synthesize here to get a clear view of brush-less (BL) wind generation.

For wind turbines and their drive train as well as connections to large-scale power grids, [active and reactive] power flows are thus essential, like in all electrical power generation systems.

Active power control is—together with wind turbine blade pitch control—associated with adjustable speed control of wind turbine rotors, of shafts in drive train, of electrical machines, here especially generators, and of active power in-feed from turbines to grid.

Reactive power control is associated with control of grid voltage in power systems, here: wind power's collection and transmission C&T as well as transmission and distribution T&D grids.

Reactive power is associated with level of air-gap flux in electrical machines, influencing efficiency as well as power factor of generator plants like wind turbines.

Reactive power production, e.g., to keep a demanded power factor, means that ratings of all converters—power electronics as well as generators—increase, compared to pure active power production.

Rotor losses in generators are increased due to reactive power production in constant-speed synchronous generators as well as in doubly-fed induction generators whether they are traditional DFIGs or a BL ASD Induction Generator, WO 00/67355 & WO 00/67363, Constant frequency machine.

In normal operation, the power factor is kept equal to one at boundaries between sectional areas in the transmission grids. In normal operation, the power factor is close to one at selected bus-bars in large sub-stations.

For wind power generation on large scale, such selected bus-bars—for power factor close to one—can be point of connection, PoC, from wind power plants to the main T&D grid. During faults, the power factor is temporarily extremely lowered so that there is a need to feed in reactive power, e.g., via VAr compensation or by the turbines themselves, to the neighbor grid at faults, expressed as utility demands, grid codes [A-G]. An innovative approach is to direct reactive power to those places in the grid where it is most useful. A tool for that is to use Transient Booster, most cost-effectively at low voltage in the nacelles, and fairly cost-effectively at medium voltage in the C&T network.

Composition of system reactive power demand and generation is carried out for an electric AC system, i.e., for an interconnected combination of generation, transmission, and distribution components, so that the reactive power balances on the system is made up of:

Reactive power demands at loads

Series reactive power (I2X) losses incurred by I2 in AC reactance, yet absolutely necessary losses for operation of AC networks Shunt reactive power ($U^2B$) gain of AC networks, especially HV cables Static compensation plants (SVCS) in service Reactive output of, or absorption by, electrical machines, like synchronous machines, generators/compensators (SMs SGs SCs)

An important technical distinction between system reactive (MVAr) reserves and system active power (MW) reserves must be pointed out: Whereas system MW can be held and used freely over the entire main interconnected system within limits imposed only by interconnecting circuit capability and availability, system MVAr reserves must be held within localized groups, say local areas. This is because voltage regulation between sending and receiving ends required for transfer of reactive power through inductive circuits makes it virtually impossible to transfer reactive power in bulk, i.e., a voltage drop relation due to line reactance with inherent series reactive ($I^2X$) losses in the lines.

Reactive power is embedded as capacitive ($U^2B$) charging current in to the cables as already mentioned. As a result, there is an embedded transfer of reactive power in bulk from cable terminals into cables for collection and transmission of wind power. At high/full load, reactive power generation ($U^2B$) and consumption ($I^2X$) are close to equal for three-phase cables.

When long overhead lines or underground cables are open-ended, e.g., at no-load, there is surplus of reactive power and a voltage rise, the so-called Ferranti effect, a long-term overvoltage. The only current flow is thereby the capacitive charging current. This explains why many lines and cables have shunt reactors installed at points where they are likely to be open-ended. Shunt AC reactors absorb VAr and hold down the voltage.

Controlling voltage is as important as supplying active power (Watts) and maintaining frequency (Hz). Excessive voltage deviations, high or low, can damage power equipment. Under certain conditions, voltage can collapse and cause a system outage. Voltage control is primarily achieved by controlling the generation, the grid and the loads, and all their Volt-Amperes Reactive (VAr).

Initial and operational planning must extend over the whole spectrum of throughput power and voltage control as well as startup & stop procedures and fault handling. It is not only concerned with the provision of adequate reactive power reserves to achieve secure bulk transfers of power over heavily $I^2X$-loaded collection and transmission circuits, but also the ability to absorb the large reactive power $U^2B$-gain of the network during periods of light active power transfer and to have absorption capability in reserve against contingencies at transient occurrences, i.e., events or circumstances which are possible but which cannot be predicted with certainty.

Plant owners and power system operators must know how to use all available/embedded means of maintaining—and returning back to—correct voltages and preventing equipment damage and system outages. So, this description holds much text/description of reactive power problems and voltage control.

On reactive power in induction machines:
  The main aspect of reactive power for normal operation of induction machines is the no-load reactive power consumption used to establish and sustain the electric field generated in the windings and the magnetic field in air-gap & slightly saturated teeth.
  A minor aspect is the reactive power consumed by the magnetic leakage associated with the slot openings close to the air-gap.
  A normally negligible aspect is the reactive power consumed by the limited permeability in iron laminations. It is normally negligible but it is essential to be comprised in modeling at heavily magnetic saturation due to overvoltage or over-currents.

On reactive power flow from doubly-fed induction machines to power grid:
  Reactive power production from DFIGs can to various degrees be achieved via the rotor armature winding, i.e., via reactive current flow also loading the generator side converter.
  Reactive power production from doubly-fed induction generators can to various degrees be achieved from grid side converter, normally connected in shunt to the low-voltage, LV, connection between the stator and the machine transformer.
  Reactive power production from nacelles with DFIGs can to various degrees be achieved from a capacitor bank (e.g., tuned, LF filter), normally connected in shunt to the grid side converter. (It could also be in shunt to the low-voltage, LV, connection between the stator and the turbine transformer.) Such a capacitor bank solution is described in conference papers, e.g., in [7] by Rabelo and Hofmann, but not found documented to be in commercial use by the major wind turbine manufacturers. Yet, it could be a cost-effective solution to expand the "VAr supplied" limited by rotor current ("field winding current") heating.
  Reactive power production via rotor armature winding means air-gap flux variation whether they are traditional DFIGs or a BL ASD Induction Generator, a constant frequency machine, WO 00/67355 & WO 00/67363.
  Air-gap flux in induction machines [and thus the machine stator voltage at grid frequency] is limited upwards as magnetic saturation will appear in iron lamination, especially in stator and rotor teeth.

On reactive power flow from power grid to doubly-fed induction machines:
  Reactive power consumption in doubly-fed induction generators can to various degrees be achieved via the rotor armature winding, i.e., via reactive current flow also loading the generator side converter.
  Reactive power consumption in nacelles with doubly-fed induction generators can also be achieved from a—fixed or controllable—shunt AC reactor, e.g., connected to the machine transformer.

There is no incentive to produce or absorb reactive power with wind power generators but it is, from systems point-of-view, necessary to have suitably located reactive reserves for achievement of stipulated voltage levels, e.g., ±5 ... ±10%, at the real time operating stage. So, system operators have put requirements on reactive power from wind turbines and wind farms to organize the disposition of reactive reserves for proper control of system voltage.

Regarding wind generation systems' reactive power, no techno-economical evaluation was found in literature. Yet, it is a necessary aspect to include reactive power production and absorption in a synthesis for inventing and evaluating BL induction generator drives with partly rated power electronics.

Reactive power problems are essential to synthesize because reactive current loading is indispensable in rating power electronic converters and rotating electrical machines in all systems for wind power generation, especially in those systems operating with adjustable speed wind turbine rotors.

Synchronizing takes place at synchronous frequency stator frequency, i.e., 50 Hz in Europe. The turbine power can thereby be anywhere below the rating of the frequency converter. The speed is then 1 to ≈1.003 pu, i.e., 1500 to 1505 rpm for a 4-pole 50 Hz MW IG. Basic embodiments of the invention are described in following points:

- At low power and "variable" low speeds, the power flow is controlled via an AC-DC-AC frequency converter rated some 0.3 pu active power (0.35 pu apparent power). Reactive power is thereby supplied both towards the induction generator and towards the power network.
- At high power and "constant or semi-variable", speeds, the power flow is controlled via the same converter but now—via the switching device/function—connected as a shunt element.
- Reactive power is thereby still supplied both towards the induction generator and towards the power network.
- Active power flow from the turbine rotor via the brush-less IG is slowly controlled by the pitch controller and rapidly by the RCC4/OptiSlip® controller
- The "constant or semi-variable" speed-torque gray-shaded area is delimited by the thick line at nominal (1 . . . 1.003 pu) speed and the dotted thick line marked "RCC at 50 Hz".
- When reaching grid frequency from the low speed/power end, the IG is synchronized to the grid and the switching device/function is closed.
- When reaching the low power level from the high power/speed end, the IG is desynchronized from the grid and the switching device/function is opened.
- At transient occurrences like grid faults, there are several options to select from:
  - At high power and "constant or semi-variable", speeds, desynchronize rapidly and engage a resistive temporary surplus power control [10-13] or engage Transient Booster rapidly and choose one of desynchronize and surplus power
  - At low power and "variable" low speeds, stay variable and sooner or later engage a resistive temporary surplus power control or stay variable and engage Transient Booster rapidly and the surplus power control later
- In both of the steady-state states, the converter is operated to smooth the power delivered to the network. Besides [synchronized] reactive power, the converter can comprise capabilities of providing voltage control, energy storage, flicker control, harmonics reduction (active filtering), and the like.

The arrangement according to the Invention makes use of the fact that technology of generator ASD operation is different from prior art of operating motor ASDs. Wind turbines are characterized by high moment of inertia and capable of freewheeling/reconfiguring as mainly controlled by a turbine rotor pitch controller.

For a safe operation, it is not necessary but cost-effective to use Transient Booster to assure that there is a close to nominal positive-sequence flux in the generator also during faults. Furthermore, it is not necessary but cost-effective to use a resistive temporary surplus power control instead of an expensive energy storage unit, e.g., SMES, accumulator battery, fuel cell, or the like.

It is cost-effective to produce reactive power not only with the partly rated AC-DC-AC frequency converter but also use a fixed (filter) capacitor FC as drawn in the same figure to fulfill the demands. The AC-DC-AC frequency converter can be operated as an active filter and/or as a flicker eliminator and/or as a smoother via small variations around a desired steady-state point. It has also the advantage that it controls the capacitor voltage in the FC so that it almost instantaneously brings FC's capacitor voltage to its pre-fault value, especially when the power flow controller is connected via Transient Booster to an AC grid.

The partly rated AC-DC-AC frequency converter can of course be embodied without a DC-voltage link. It is possible to use any AC/AC converter which is capable of frequency conversion from a low frequency up to at least the grid frequency for synchronizing, and capable of reactive power production. An example of an AC-DC converter without a DC-voltage link is the so-called matrix converter.

As it is difficult—lack of power semiconductors, especially IGBTs—to provide frequency converters at voltages near 1 kVac, which is preferred for a few MW power flow, there can be embodiments with:

- IGCTs, integrated gate commutated thyristors, allowing higher voltages than IGBTs,
- 2*3ϕ machines, 2*3 ϕ frequency converters and 2*3 ϕ turbine transformers,
- auto-transformers, and the like to get to >5 MW turbines and IGBT-converters at 0.4 . . . 0.7 kV.

A guiding principle, a lodestar, is cost-effectiveness combined with low maintenance, i.e., availability and reliability in comparison with state-of-the-art. Reactive and/or resistive series elements can be used as (temporary) series link elements. A unified power flow controller, UPFC, can also be a controllable series-shunt arrangement of the AC-DC-AC converter to provide voltage and VAr control. It is preferred to use temporary surplus power control as resistive shunt element(s) with at least one switch.

An evaluation of advantages on a 2 MW turbine level and 20 years life-time shows—with a DFIG and 30% power electronics connected to the generator's brushes and slip-rings from generator shaft to low-voltage circuit-breaker summed to a cost reference (100%)—that:

- accumulated cost for maintenance of brushes and slip-rings is at least 20%
- a loss of income for 1 day/year production stop due to brushes and slip-rings is approx. 20%, for off-shore parks, it is most likely closer to a week per year due to weather limitations
- the initial cost of a Transient Booster is approx. 20%
- the BL IG, also including RCC4/OptiSlip®, is cheaper than a slip-ring IG used in DFIGs The gearbox, the turbine transformer and the medium voltage equipment are the same and excluded from the 100% base. The cost of the AC-DC-AC converter in The inventive arrangement is the same as that for DFIG. The energy yield at low winds and the conversion efficiency at high winds are likely a little bit higher for the inventive arrangement than for DFIGs. With the same 100% level, Δη=0.5% means approx. 20% better.

As a summary, the novel Power flow control(ler) for grid-connection of wind turbines and parks. The inventive arrangement will sum up to a positive cost-benefit well worth an evaluation by at least the turbine manufacturers. Regarding developers, owners, insurance companies, power utilities and grid operators it is judged worth to communicate the novelty and advantages to them, too.

The inventive arrangement is a cost-effective, well-nigh loss-less novel circuit characterized by that the wind turbine operates with two steady-state states and that it is a switching device/function which reconfigures the circuit, FIG. 1 The new brush-less method and circuit is based on BL asynchronous machines, on partly (30%) rated power electronics and on low-voltage (<1 kVac) control- & switch-gear. All are high-performance products with 100 000s of hours or maneuvers, almost loss-less and very reliable.

DFIG's brushes and slip-rings are omitted. Maintenance costs and production loss disappear.

During normal operation, hitherto known main circuits are kept and efficiency is increased.

The inventive arrangement benefits from Transient Booster

The drive-train—e.g. the gearbox—is released from mechanical stress.

At the same time, collection and transmission grids are released from electrical stress during grid faults.

Reactive power compensation equipment in turbine is continuously controlled.

Voltage recovery after faults is improved as turbine's reactive power drain is eliminated.

Power electronics rating is rated due to stationary needs and scaleable well above 5 MW.

Upgrade/retrofit markets are anticipated at 1-2 MW and maybe at lower ratings, too.

The method and hardware are especially attractive for emerging park demands but are also a basis for reviving existing turbines at sea as well as on land to fit with new or expanded grid codes.

Although favorable the scope of the invention must not be limited by the embodiments presented but contain also embodiments obvious to a person skilled in the art. For instance

The invention claimed is:

1. A wind mill apparatus for generating electric power to a grid point of an electric network, the apparatus comprising
a wind rotor,
an electric generator operatively connected to the wind rotor, and
an electric multiphase ac link connecting the generator to the grid point, the ac link comprising a first current path comprising a switchgear, a second current path comprising a dc link comprising a first converter operatively connected to the generator, a second converter operatively connected to the grid point, a capacitor operatively connected between the conductors of the dc link, a connectable multiphase dump load comprising a transient booster for blocking the reactive power flow in the ac link during a fault condition on the network and providing a reduced transfer of active power, wherein the transient booster is connected in series with the generator between the switchgear and the grid point, the dump load further comprising a temporary surplus power control as resistive shunt element which is temporarily connectable in shunt connection between the generator and the grid point for providing a retardation force on the generator.

2. The apparatus according to claim 1, wherein the dump load further comprises a resistor connected in parallel with the capacitor of the dc link.

3. The apparatus according to claim 1, further comprising:
synchronizing means for providing the generator to stay synchronized with the network.

4. The apparatus according to claim 1, wherein the converters of the dc link comprise a rating of less than 50% of the rated power of the generator.

5. The apparatus according to claim 4, wherein the converters of the dc link comprise a rating of less than 30% of the rated power of the generator.

6. A method for maintaining a power production from a wind mill apparatus during a fault condition in a grid point of a network comprising a wind rotor and operatively connected thereto an electric generator, and an electric multiphase ac link operatively connecting the generator to the grid point, the link comprising a first current path comprising a switchgear, a second current path comprising a dc link comprising a first converter operatively connected to the generator, a second converter operatively connected to the grid point, and a capacitor operatively connected between the conductors of the dc link, the method comprising:
providing power via the second current path in case of a fault condition on the network at low power and variable low speeds of the electric generator, and
either engaging a transient booster to block the reactive power flow in the ac link, providing a reduced transfer of active power and later engaging a temporary surplus power control in the form of a resistor in shunt connection with the generator in order to consume electric energy from the generator or
only engaging the temporary surplus power control.

7. The method according to claim 6, wherein at a high power and at constant or semi-variable speeds of the electric generator
either providing power through the first current path and engaging the transient booster and later either providing power through the second current path or engaging the temporary surplus power control
or directly providing power through the second current path and engaging the temporary surplus power control.

8. The method according to claim 6, wherein blocking the reactive power flow in the ac link further comprises retardation of a generator rotation speed by providing resistor connected between the conductors of the dc link.

9. A computer program product, comprising:
a non-transitory computer readable medium; and
computer program instructions recorded on the computer readable medium and executable by a processor to carry out a method for maintaining a power production from a wind mill apparatus during a fault condition in a grid point of a network comprising a wind rotor and operatively connected thereto an electric generator, and an electric multiphase ac link operatively connecting the generator to the grid point, the link comprising a first current path comprising a switchgear, a second current path comprising a dc link comprising a first converter operatively connected to the generator, a second converter operatively connected to the grid point, and a capacitor operatively connected between the conductors of the dc link, the method comprising:
providing power via the second current path in case of a fault condition on the network at low power and variable low speeds of the electric generator and
either engaging a transient booster to block the reactive power flow in the ac link, providing a reduced transfer of active power and later engaging a temporary surplus power control in the form of a resistor in shunt connection with the generator in order to consume electric energy from the generator or
only engaging the temporary surplus power control.

10. The computer program product according to claim 9, wherein the computer program instructions are further for providing the computer program instructions at least in part over a network.

11. The computer program product according to claim 8, wherein the network is the internet.

* * * * *

UNITED STATES PATENT AND TRADEMARK OFFICE
CERTIFICATE OF CORRECTION

| | | |
|---|---|---|
| PATENT NO. | : 8,436,490 B2 | Page 1 of 1 |
| APPLICATION NO. | : 11/991326 | |
| DATED | : May 7, 2013 | |
| INVENTOR(S) | : Gertmar et al. | |

It is certified that error appears in the above-identified patent and that said Letters Patent is hereby corrected as shown below:

Title Page, item (75) Inventors: ~~Stefan Thorburn-Johansson~~ should read Stefan Thorburn

Signed and Sealed this
Twenty-ninth Day of October, 2013

Teresa Stanek Rea
*Deputy Director of the United States Patent and Trademark Office*